United States Patent [19]

Kimura et al.

[11] 4,131,355

[45] Dec. 26, 1978

[54] FINDER OPTICAL SYSTEM FOR SINGLE LENS REFLEX PHOTOGRAPHIC CAMERAS

[75] Inventors: Tadashi Kimura, Tokyo; Fumitaka Watanabe, Hachiouji, both of Japan

[73] Assignee: Olympus Optical Co., Ltd., Tokyo, Japan

[21] Appl. No.: 790,752

[22] Filed: Apr. 25, 1977

[30] Foreign Application Priority Data

Apr. 27, 1976 [JP] Japan .............................. 51-52060[U]

[51] Int. Cl.² ...................... G03B 13/02; G03B 19/12
[52] U.S. Cl. ..................................... 354/225; 354/155
[58] Field of Search ................................ 354/150–155, 354/53, 54, 224, 225, 219

[56] References Cited

U.S. PATENT DOCUMENTS

| 3,094,911 | 6/1963 | Reiche et al. ............................ 354/54 |
| 3,250,195 | 5/1966 | Maitani .................................. 354/155 |
| 3,757,656 | 9/1973 | Kuramoto ............................. 354/225 |
| 3,962,710 | 6/1976 | Okuno et al. ......................... 354/225 |
| 4,021,830 | 5/1977 | Kanno ............................... 354/155 X |

*Primary Examiner*—Donald A. Griffin
*Attorney, Agent, or Firm*—Cushman, Darby & Cushman

[57] ABSTRACT

A finder optical system for single-lens reflex photographic cameras wherein an even number at least four of small reflecting surfaces are arranged in front of a pentagonal prism of a single-lens reflex photographic camera in such a way that an image of optical information such as graduations on diaphragm dial or shutter speed dial is reflected consecutively by said small reflecting surfaces, whereafter said image of optical information is projected around the field of view in a finder, said finder optical system being capable of projecting an image of optical information free from difference in dioptor at any desired position around said field of view in the finder by changing locations and/or relative tilting angles of said small reflecting surfaces.

2 Claims, 14 Drawing Figures

FIG. IA
PRIOR ART
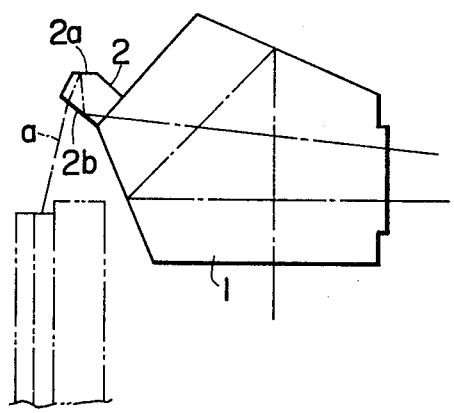
FIG. IB
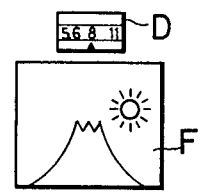
FIG. 2A
PRIOR ART
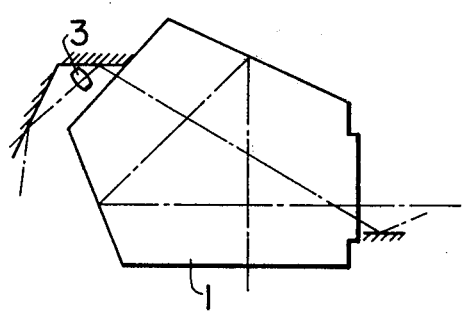
FIG. 2B
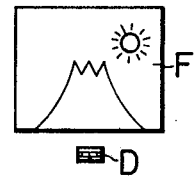

FINDER OPTICAL SYSTEM FOR SINGLE LENS REFLEX PHOTOGRAPHIC CAMERAS

BACKGROUND OF THE INVENTION (a) Field of the invention:

The present invention relates to an optical system for projecting information such as graduations on a diaphragm dial or shutter speed dial within a field of view of a finder of single-lens reflex photographic cameras comprising a pentagonal prism in said finder.

(b) Description of the prior art:

There have conventionally been known a variety of methods for observing an image of information such as graduations on diaphragm dials and shutter speed dials within a field of view of finders of single-lens reflex cameras, said methods being roughly classified into two types. One type of method is to project graduations on a diaphragm ring or shutter speed ring within a field of view of finder by using an appropriate optical system. Such an optical system functions, as illustrated in FIG. 1A, in such a manner that optical information of graduations on a shutter speed ring or diaphragm ring indicated by chain lines is reflected on surfaces 2a and 2b of a prism 2 so as to follow an optical path a, whereafter said optical information is passed through a pentagonal prism 1 for observation within the field of view of a finder. Speaking more concretely, said optical information is made visible at the position indicated by symbol D which is located above the field of view F as shown in FIG. 1B. The other type of method is to project an image of graduations on special dial interlocked with a diaphragm operating means or shutter speed operating means within the field of view of a finder. Of these two methods, the former does not require a mechanical interlocking system and is hence more advantageous than the latter. However, the former method produces difference in dioptor between the filed of view in the finder and information image which can hardly be eliminated. FIG. 2A and FIG. 2B illustrate an example of optical system wherein said defect has been eliminated by inserting several miniature lenses in the optical path for matching the dioptor between the field of view in the finder and information image. However, such an optical system has drawbacks that it is rather difficult to manufacture in practice, that image information is minimized and that it is impossible to optionally select image position in the finder. The second method has defects that it requires a disc or film graduated with diaphragm aperture divisions or shutter speed divisions as well as a mechanical system for interlocking said graduation disc with the diaphragm ring, etc., thereby unavoidably making mechanisms of the photographic cameras very complicated.

SUMMARY OF THE INVENTION

A general object of the present invention is to provide an optical system so adapted as permit observing an image of optical information such as graduations on a diaphragm dial or shutter speed dial to an optional position around the field of view in a finder by an optical means in single-lens reflex photographic cameras.

BRIEF DESCRIPTION OF THE DRAWINGS

FIG. 1A and FIG. 2A show diagrams illustrating the composition of a conventional finder optical system for single-lens reflex photographic cameras;

FIG. 1B and FIG. 2B show diagrams illustrating the field of view obtainable with the optical system shown in FIG. 1A and FIG. 1B;

DESCRIPTION OF THE PREFERRED EMBODIMENT

Figure 3A:
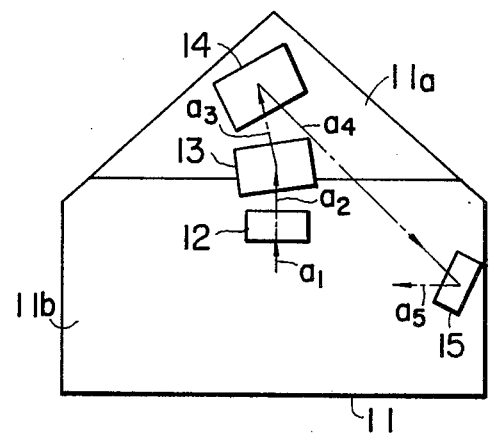
FIG. 3A and FIG. 3B show a front elevation and a side view of the Embodiment 1 of the present invention.
Figure 3B:
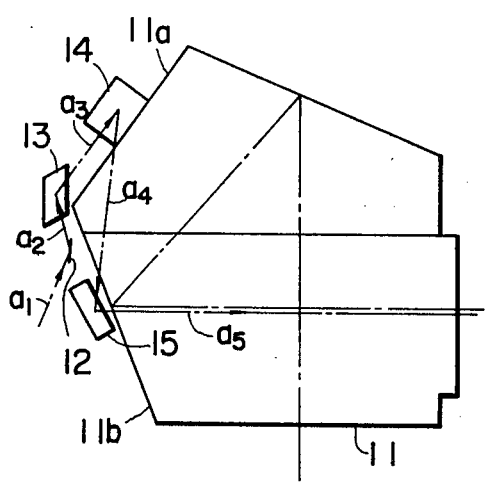
Figure 3C:
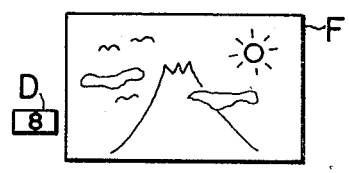
FIG. 3C illustrates a diagram showing the field of view obtainable with the Embodiment 1.
Figure 4A:
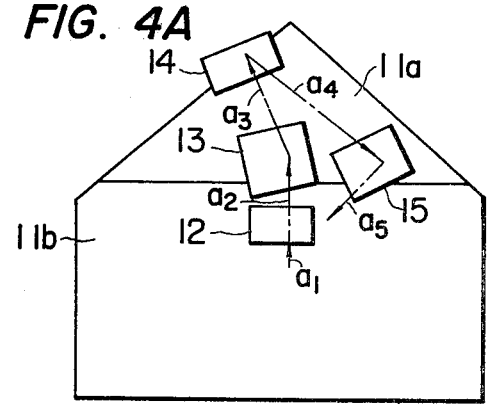
FIG. 4A and FIG. 4B illustrate a front elevation and a side view showing the Embodiment 2 of the present invention.
Figure 4B:
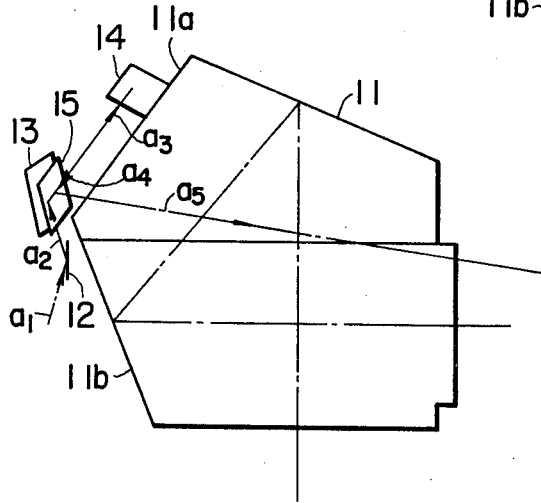
Figure 4C:
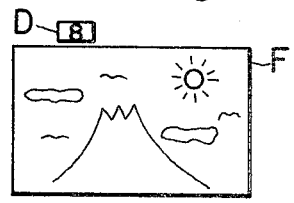
FIG. 4C illustrates a diagram showing the field of view obtainable with the Embodiment 2.

Now, the present invention will be described more concretely with reference to the accompanying drawings illustrating the preferred embodiments. FIG. 3A and FIG. 3B illustrate a first embodiment of the present invention, FIG. 3A showing a diagram of the optical system according to the present invention taken from the front side of the photographic camera, whereas FIG. 3B illustrating a view taken from the side of said camera with the camera body and other components omitted. FIG. 3C shows a field of view in the finder within which an image of graduations is projected. In these drawings, the reference numeral 11 represents a pentagonal prism, and the reference symbols 12, 13, 14 and 15 designate small reflecting mirrors respectively. In the finder optical system according to the present invention, the small reflecting mirrors disposed on the front surfaces 11a and 11b of the pentagonal prism 11 serve for transmitting optical information such as graduations on a shutter speed dial or diaphragm dial along the optical path indicated by the reference symbol a1, a2, . . . to permit observing an image of said optical information around the field of view in the finder. In this embodiment, the graduations D is observed on the side of the field of view F as illustrated in FIG. 3C. FIG. 4A and FIG. 4B show a second embodiment of the present invention. In this embodiment, the small reflecting mirrors 12, 13 14 and 15 are arranged at locations which are more or less different but substantially equivalent to those shown in FIG. 3A and FIG. 3B. This embodiment is so constructed as to observe an image of the graduations above the field of view F as shown in FIG. 4C.

In the above-mentioned embodiments, the first small reflecting mirror 12 functions to transmit upward the optical information such as graduations on the shutter speed dial or diaphragm dial disposed on a shutter ring or diaphragm ring. That is to say, optical information emitted from the shutter speed dial or the similar component travels in the direction indicated by the reference symbol a1 in the drawings and is reflected by said first small reflecting mirror 12 so as to follow the optical path indicated by the reference symbol a2. The second small reflecting mirror 13 serves for transmitting the optical information from the first small reflecting mirror 12 in the direction along the front upper surface 11a of said pentagonal prism 11. Speaking in other words, the optical informatioon reflected by said first small reflecting mirror is further reflected by the second small reflecting mirror 13 so as to follow the optical path indicated by the reference symbol a3. Furthermore, the third small reflecting mirror 14 and the fourth small reflecting mirror 15 are arranged for observing an image of said optical information at any desired position around the field of view in the finder. Speaking in more detail, the optical information reflected by the second small reflecting mirror 13 is reflected by the third small reflecting mirrror 14 so as to follow the optical path indicated by the reference symbol a4, and is further reflected by the fourth small reflecting mirror 15 so that said optical information will pass through the pentagonal prism 11 and follows the optical path indicated by the reference symbol a5. It is therefore possible to project an image of said optical information to any desired position around the field of view in the finder by changing the locations and/or tilting angles of said small reflecting mirrors, especially those of the third and fourth mirrors. It is also possible to eliminate difference in dioptor between the image of said optical information and field of view in the finder by properly adjusting the distances between respective small reflecting mirrors (mainly by changing the locations of the second and third small reflecting mirrors). It is further possible to prevent the image of said optical information from tilting by properly adjusting relative tilting angles among said small reflecting mirrors. Since the first through fourth small reflecting mirrors have the functions at their own respectively as described above, the finder optical system according to the present invention requires at least four small reflecting surfaces. However, the number of such small reflecting mirrors is not limited to four but can be even number of four or more.

Figure 5A:
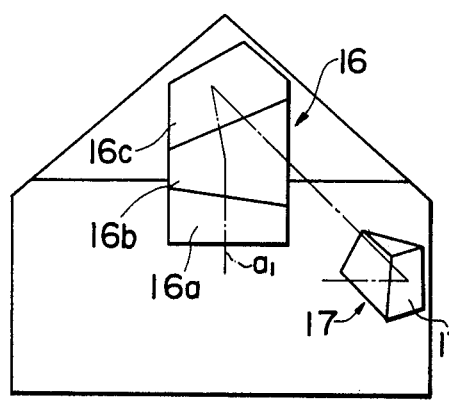
FIG. 5A and FIG. 5B show a front elevation and a side view illustrating the Embodiment 3 of the present invention.
Figure 5B:
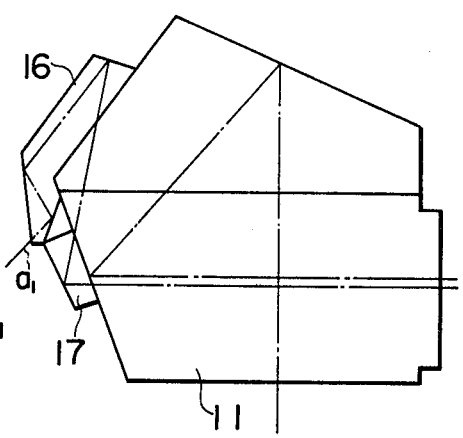
Figure 6A:
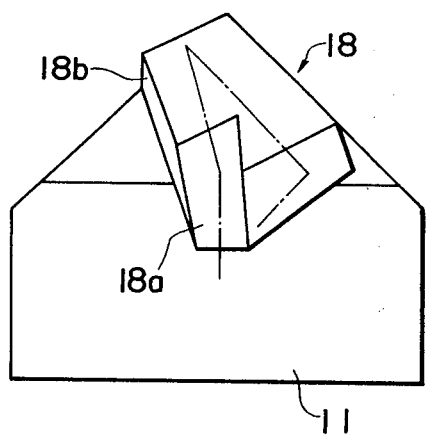
FIG. 6A and FIG. 6B show a front elevation and a side view of the Embodiment 4 of the present invention.
Figure 6B:
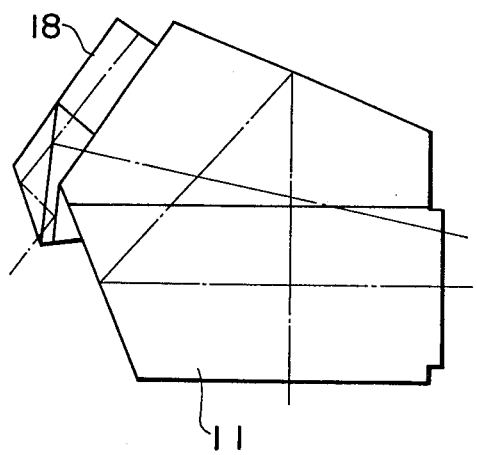

FIG. 5A and FIG. 5B as well as FIG. 6A and FIG. 6B illustrate third and fourth embodiments of the present invention respectively, wherein molded members made of acrylic resin 16, 17 and 18 are disposed on the front surface of the pentagonal prism, and surfaces 16a, 16b, 16c, 17a, 18a, 18b, etc. correspond to the reflecting surfaces of the small reflecting mirrors described with reference to the Embodiments 1 and 2. The arrangement shown in FIG. 5A and FIG. 5B corresponds to that illustrated in FIG. 3A and FIG. 3B, whereas disposition shown in FIG. 6A and FIG. 6B is equivalent to that illustrated in FIG. 4A and FIG. 4B.

As is easily understood from the foregoing descriptions, the finder optical system according to the present invention is compact in its overall design, simple in its construction and requires only a narrow space for arranging said small reflecting mirrors since said optical system permits directly transmitting photographic information such as graduations on a diaphragm dial, shutter speed dial, etc. only with small reflecting mirrors without requiring a special dial for observing an image of photographic information within a field of view in a finder or any interlocking mechanisms. Further, the finder optical system according to the present invention enables to observe a sharp image free from tilting at any desired position around the field of view in a finder and to eliminate difference in dioptor between the field of view and image of optical information without using any lens system. Owing to the fact that any lenses are not used in the optical path, said optical system has a simple construction, and can easily be machined and assembled. Furthermore, the finder optical system according to the present invention is excellent from the viewpoint of human engineering since it does not produce difference in dioptor and relieves photographers from fatigue of their eyes.

We claim:

1. A finder optical system for single-lens reflex photographic cameras wherein an even number of at least four small reflecting surfaces are arranged on the front surface of a pentagonal prism, an optical information such as graduation on the diaphragm dial or shutter speed dial arranged on the diaphragm ring or shutter ring of the camera is reflected consecutively by said small reflecting surfaces so as to emerge from said pentagonal prism, whereby said optical information is visible at any optional position around the field of view in the finder, and wherein said reflecting surfaces consist of a first small reflecting surface, a second small reflecting surface, a third small reflecting surface and a fourth small reflecting surface, said first small reflecting surface functioning to reflect said optical information upward, said second small reflecting surface functioning to further reflect the optical information reflected by said first small reflecting surface in such a way that said optical information is directed upward along the front upper surface of said pentagonal prism, and said third and fourth small reflecting surfaces functioning to permit observing an image of the optical information from said second small reflecting surface at any desired position around the field of view in a finder.

2. A finder optical system for single-lens reflex photographic cameras according to claim 1 wherein a molded member made of a clear synthetic resin material is disposed in front of said pentagonal prism and said small reflecting surfaces are formed on said molded member.

* * * * *